Figure 1:
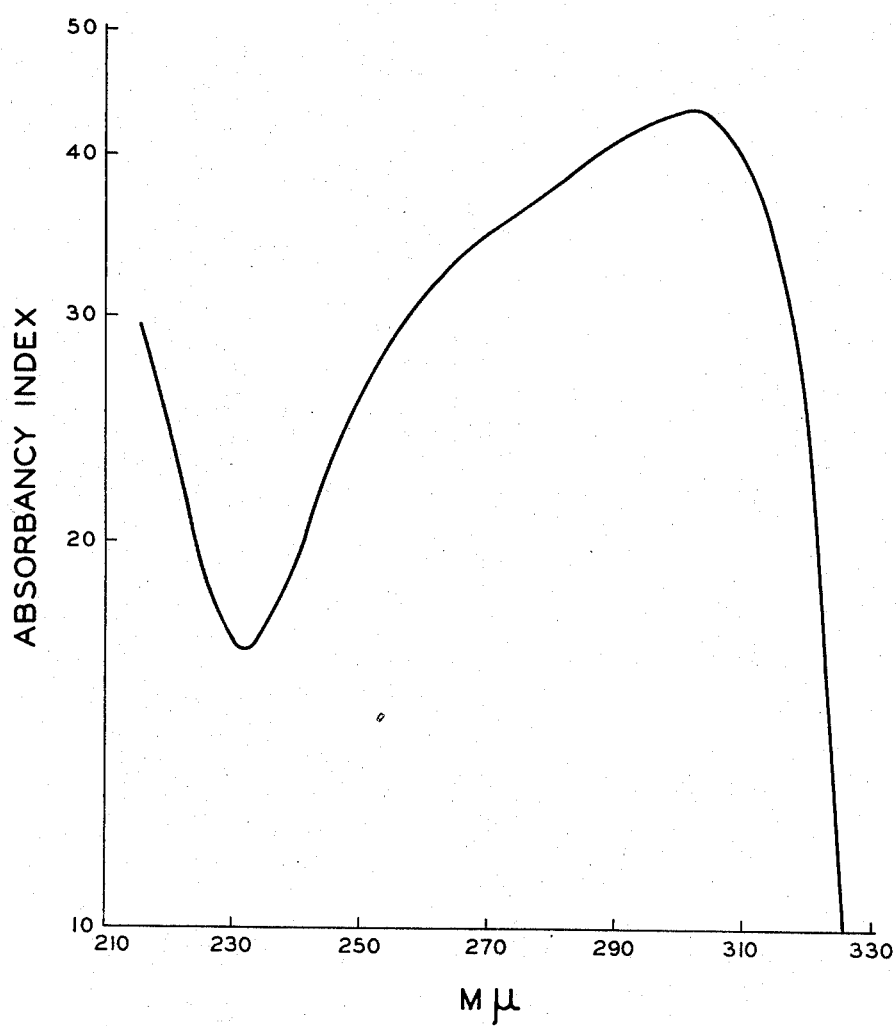
Figure 2:
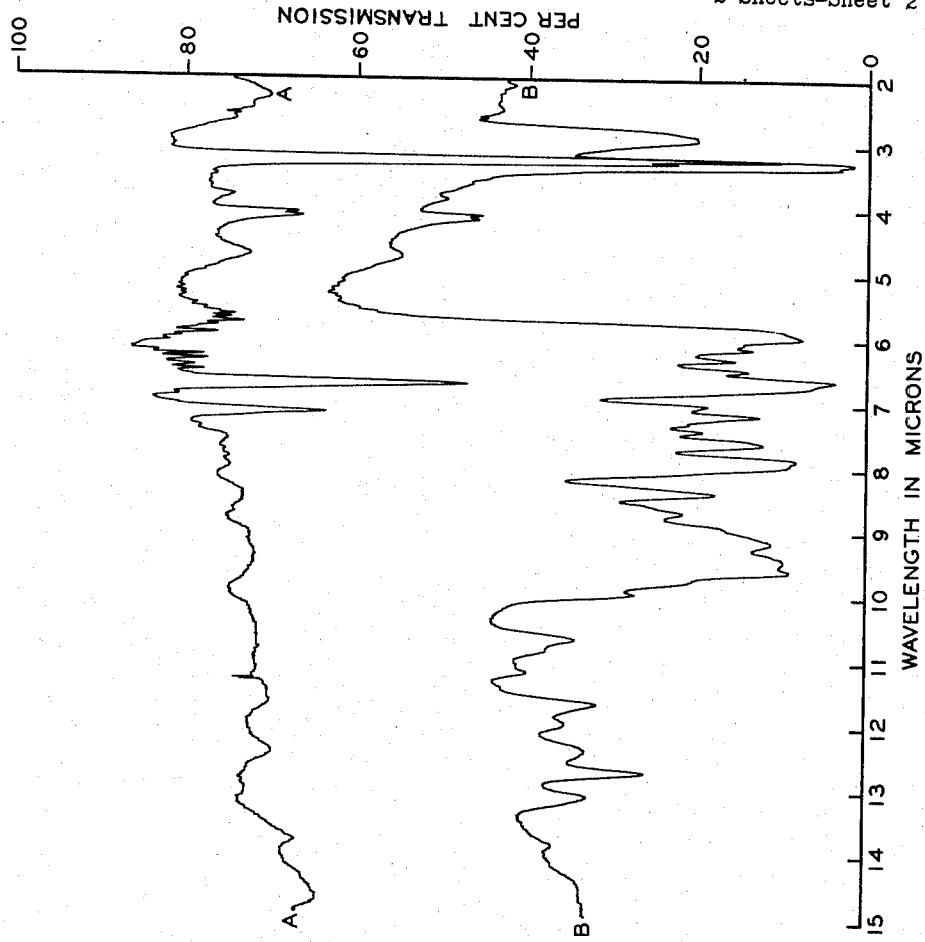

United States Patent Office 2,902,480
Patented Sept. 1, 1959

2,902,480

PROCESS FOR RECOVERY OF ANTIBIOTIC AMICETIN

Phil Harter Hidy, William F. Phillips, and Roger L. Harned, Terre Haute, Ind., assignors to Commercial Solvents Corporation, Terre Haute, Ind., a corporation of Maryland Application February 10, 1956, Serial No. 564,754

5 Claims. (Cl. 260—211.5)

This invention relates to antibiotics and more particularly it relates to the new antibiotic composition amicetin and to a method for producing it.

This application is a continuation-in-part of our prior application Serial No. 349,032, filed April 15, 1953.

It is generally recognized that one of the limitations of successful antibiotic therapy is that infectious organisms develop resistance to the agents and therefore become less useful in combating diseases. This is true in the case of penicillin, which is primarily active against Gram-positive bacteria, and is even more strikingly true in the case of streptomycin which is useful in therapy of one of our most dreaded diseases, tuberculosis, which is caused by a mycobacterium. It has therefore become increasingly obvious that additional antibiotic agents are needed to combat these mycobacteria and bacteria in general which have been shown to be capable of developing resistance to previously known antibiotics.

An antibiotic has now been discovered which is primarily active against Gram-positive bacteria including mycobacteria such as *Mycobacterium tuberculosis*, *Mycobacterium ranae*, etc. Our new antibiotic is called amicetin and is produced by an unidentified streptomycete isolated from the soil which organism we have designated Streptomyces sp. AG–35, activity by the agent having been exhibited in vitro and in vivo.

In the form of an inner salt, amicetin gives a solution in water of a pH of about 7.0 to 7.2. In the neutral salt form, the new antibiotic is soluble in aqueous alcohols such as methanol, ethanol, butanol, etc. and slightly less soluble in dry alcohols. In the neutral salt form, the new antibiotic is soluble in dilute acids and alkalis but unstable in both, it is slightly soluble in acetone and soluble to the extent of 8 mg./ml. in water at room temperature. The antibiotic in the form of the hydrochloride is extremely soluble in water. In the neutral salt form, the material is insoluble in benzene, petroleum ether, ether, and hydrocarbon solvents such as heptane, hexane, etc.

In the neutral salt form, the new antibiotic contains carbon, hydrogen, nitrogen, and oxygen and upon analysis has been found to contain the following approximate proportions of the various elements:

| | Percent |
|---|---|
| Carbon | 52.9 |
| Hydrogen | 6.7 |
| Nitrogen | 12.4 |
| Oxygen (by difference) | 28.0 |

In the neutral salt form, the new antibiotic has a broad melting point of 185 to 195° C. and an optical rotation of $[\alpha]_D^{25} = +129.8°$, c.=10.68%, 1=1.0 dm., aqueous solution, pH=4.97. The empirical formula of the neutral salt form of the new antibiotic compound is $$(C_5H_8NO_2)_n$$

In the neutral salt form, the new antibiotic gives a negative ninhydrin test indicating it unlikely that the material contains free α-amino acid group. The material also gives a negative biuret test indicating that the agent does not contain a protein or peptide structure. A negative Benedict's test indicates the absence of reducing sugar or equivalent; however a positive Baeyer test indicates the probable presence of reducing groups such as $>C=C<$, $-CH_2OH$, etc. Secondary amine tests employing aqueous nickel chloride solution saturated with carbon disulfide are negative, the reagent employed reacting strongly positive for a control test with piperidine.

In the neutral salt form, the new antibiotic has been produced and recovered in crystalline form, the crystals being colorless needles. When the crystals are dissolved in water they give a solution of pH 7.0–7.2. When the pH is lowered with hydrochloric acid, a mineral acid salt is formed which in aqueous solution has a pH of about 4.9. When the pH of an aqueous solution of the hydrochloride is raised, the neutral material crystallizes but, upon warming, the crystals go back into solution and if the pH is then raised to 8.0 to 8.5 the so-called "free-base," which is much less water soluble than the neutral material, crystallizes at the elevated temperature. The free-base melts at about 160–165° C. as compared to 185–195° C. for the neutral material. If the crystalline free-base is warmed in alcohol or aqueous suspension it is converted to a new crystalline form which precipitates from the solution. This crystalline form of the free-base has a melting point of about 243–244° C. and can be reconverted to the neutral form.

Ultra-violet absorption studies have been conducted on the new antibiotic. Figure I of the accompanying drawing is a graph of the ultra-violet absorption spectrum of our new material and it can be seen that the neutral salt form of the new material has an absorbency index in neutral solution in water of 43.3 at a wave length of 302 millimicrons.

Infra-red absorption studies have been conducted on a suspension obtained by mulling the crystalline neutral salt form of amicetin with mineral oil. The infra-red absorption spectrum of the material is shown in Figure II of the accompanying drawing. The curve marked A is the spectrum of a mineral oil blank while the curve marked B is the spectrum of a mineral oil mull of the antibiotic. A strong, broad absorption ban can be noted at a wave length of 2.95μ. The area from 3.4 to 3.5μ is masked by the mineral oil in which the amicetin was mulled. There are no absorption bands at all from 3.6 to 5.7μ while at 5.85, 6.03, and 6.23 there is a series of partially resolved strong absorption bands. A strong band can be seen at 6.68μ and there is a series of medium absorption bands at 7.60, 7.95, 8.40, and 8.75μ. Another series of strong partially resolved bands can be seen at wave lengths of 9.20, 9.45, and 9.55μ while weak absorption bands can be seen at 10.68, 11.68, 12.46, 12.80μ.

The acute intraperitoneal toxicity in mice of pure crystalline amicetin in the neutral salt form is as follows:

$LD_0 = 400$ mg./kg.
$LD_{50} = 530 \pm 64$ mg./kg.
$LD_{100} = 800$ mg./kg.

The antibiotic amicetin is primarily active against Gram-positive bacteria including mycobacteria and corynebacteria. The antibiotic is essentially inactive against Gram-negative organisms, there being a few exceptions. The antibacterial spectrum shown in Table I is illustrative of the organisms against which antibiotic amicetin is active.

TABLE I

*Antibacterial spectrum*

| Organism | Minimal Inhibitory Concentrations, micrograms/ml. |
|---|---|
| Sarcina lutea | 0.454– 2.28 |
| Mycobacterium ranae | 0.454 |
| Corynebacterium diphtheriae | 0.454– 2.28 |
| Corynebacterium xerose | 0.965– 3.52 |
| Corynebacterium renale | 0.965– 3.52 |
| Lactobacillus acidophilus | 0.71 – 1.42 |
| Leuconostoc mesenteroides | 0.177– 0.355 |
| Erysipelothrix rhusiopathiae | 0.71 – 1.42 |
| Gaffkya tetragena | 1.42 – 3.52 |
| Streptococcus faecalis | 11.3 –22.6 |
| Streptococcus agalactiae | 5.7 –11.3 |
| Streptococcus erysipelatus | 11.3 –22.6 |
| Micrococcus pyogenes var. aureus | 11.3 –22.6 |
| Pasteurella pseudotuberculosis | 11.3 –22.6 |
| Streptococcus hemolyticus | 22.6 –34.0 |
| Brucella abortus | >45.5 |
| Proteus vulgaris | >45.5 |
| Salmonella typhimurium | >45.5 |
| Shigella dysenteriae | >45.5 |
| Bacillus subtilis | >45.5 |

The new antibiotic amicetin is active in vivo as illustrated by the activity of the antibiotic in mice against *Mycobacterium tuberculosis* var. *hominis*, strain H37Rv. In an experiment to test the in vivo activity of amicetin, two groups of twenty mice were infected introvenously with 1.0 mg. of a virulent culture of *Mycobacterium tuberculosis*. The antibiotic at 400 mg./kg. of body weight of test mice was given twice daily by subcutaneous injections about 8 hours apart to one group and at 200 mg./kg. to the other group. At the same time, control mice were given no antibiotic treatment. The period of the test was 14 days. The following table gives the results of the experiment.

TABLE II

*Amicetin activity in mice against Mycobacterium tuberculosis*

| Antibiotic | Total Daily Dosage (mg./kg.) | Number of Mice | Median Survival Time in Days |
|---|---|---|---|
| AG–35 | 400 | 20 | 35.5 |
| AG–35 | 200 | 20 | 27 |
| None | | 10 | 14 |

The new antibiotic material is produced by an hitherto unidentified species of microorganism which has been designated Streptomyces sp. AG–35. The organism was isolated from a soil sample obtained from a flower bed in Western Indiana and the culture was purified by several single colony isolations.

The organism forms a mycelium with typical aerial hyphae. The organism is mesophylic. The organism is aerobic and can utilize glycerin, dextrose, raffinose, maltose, starch, sucrose, galactose, lactose, inositol, sodium acetate, etc. as carbohydrate sources while being unable to utilize rhamnose and dulcitol as cabohydrate sources. Soluble pigment is formed on some media but not on calcium malate agar, Bennett's agar, starch agar, or gelatin stab. When pigment is produced, it appears to be dark red.

When grown on Bennett's agar at 28° C., Streptomyces sp. AG–35 requires about 10 days before aerial growth may be observed macroscopically. This growth is then a buff to tan mat over the surface of the white submerged mycelial growth. Upon aging the surface growth becomes soft and easily separated from the submerged mycelial mat and takes on a dull grayish color.

The following characteristics were observed in colonial morphology, growth-habits and biochemical reactions when the organism Streptomyces sp. AG–35 was grown on the substrates listed:

Czapek's agar, 25° C.: After 6 days' incubation, aerial hyphae 1–3µ in diameter; vegetative mycelium much finer. Conidia not observed; colony white, velutinose, margin entire.

Gelatin stab, 25° C.: After 8 weeks' incubation, floccose sediment, tan to white colonies with white aerial growth adhering to glass at surface. Small colonies throughout medium. No liquefaction observed in 12 days. Liquefaction complete in 56 days. No soluble pigment formed.

Calcium malate agar, 25° C.: After 7 days' incubation, round, velutinose, soft-white aerial grows on tan mycelial mat. No soluble pigment formed.

Bennett's agar plates, 25° C.: Chalk-white, velutinose, round colonies, after 7 days' incubation. Surface of colonies pitted. Reverse brown. No soluble pigment diffused in agar.

Starch agar A, 25° C.: After 5 days' incubation, round, convex to effuse colonies with chalk-white aerial growth; reverse white. Starch hydrolysis limited. No soluble pigment formed.

Sulfide medium, 25° C.: After 10 days' incubation, no hydrogen sulfide produced.

Litmus milk, 25° C.: Gray, cartilagenous ring growth. After 8 days, chalk-white surface growth with increase in alkalinity. Peptonization observed. Dark red soluble pigment formed.

Litmus milk, 37° C.: Gray, cartilagenous ring growth. No sporulation, peptonization, nor curd formation observed.

Tyrosine agar, 25° C.: After 6 days' incubation, light tan, circular, non-sporulated colonies; reverse tan.

Bennett's agar slants, 25° C.: After 7 days' incubation, chalk-white, velutinose surface growth on light tan raised mycelium. Reverse tan. No soluble pigment observed.

The new antibiotic amicetin, described above, is produced by the unidentified organism Streptomyces sp. AG–35, also described above, when cultivated in suitable nutrient media. Media containing a suitable source of protein and a suitable source of carbohydrates are satisfactory for amicetin production, air being supplied to the nutrient medium which is incubated at a temperature between about 20 and 35° C. Generally, temperatures of about 25 to 28° C. are preferred for cultivation of the organism in the nutrient medium.

Suitable protein substances useful as sources of nitrogen in nutrient media for amicetin production include soybean oil meal, Nutrisoy (dry soybean meal-like product), Kel Solvsoy (finely ground refined protein from soy flour), soy peptone, Edamin (enzymatic digest of lactalbumin), castor pomace, Ossein concentrate (concentrated albumenoid material which remains after treating bones with dilute hydrochloric acid), alfalfa meal, Tec Nutrient (enzymatic digest or acid hydrolysate of water-extracted liver meal), defatted cottonseed meal, etc. Of the above it has been found that soy peptone, soybean oil meal, and the various refined soy flours are outstanding sources of nitrogen and are preferable from a standpoint of availability and high yields.

Suitable carbohydrates which may be employed in nutrient media for production of the new antibiotic include glycerol, cerelose, maltose, sucrose, starch dextrin, etc.

Generally it has been found that the yields are greatly increased by the addition of calcium carbonate to the nutrient medium and in most instances practical yields of the antibiotic are only obtained when calcium carbonate is added to the medium. For maximum antibiotic production the medium should contain from 0.25 to about 4% of the carbohydrate and from about 0.25 to 5% by weight of the proteinaceous material. The calcium carbonate should be employed in amounts ranging from about 0.25 to about 1.5% by weight. In producing the new antibiotic, a medium composed of 3% soybean meal, 2% cerelose, and 0.5 to 1.0% calcium carbonate is preferred. Generally, the pH of the medium should be maintained within the range of from about 6.0 to 8.5 with maximum antibiotic production occurring after about 48 hours of fermentation.

Since the organism Streptomyces sp. AG–35 is an aerobic organism, air must be supplied to the nutrient medium and agitation can be employed to disperse the added air throughout the nutrient medium. Agitation can be effected by means of a propeller type agitator in the fermenter or by means of any other suitable agitator while air can be supplied through a sparger in the base of the fermenter.

It is usually necessary to add an anti-foam agent to the nutrient medium during fermentation for the production of amicetin and any of the usual anti-foam agents such as, for example, mineral oil, lard oil, higher aliphatic alcohols such as for example, octadecanol, etc. can be used for this purpose.

The following specific example is offered to illustrate the production of amicetin with Streptomyces sp. AG–35.

EXAMPLE I

A 70-gallon portion of a medium consisting of:

| | Percent |
|---|---|
| Soybean meal | 3 |
| Cerelose | 2 |
| Calcium carbonate | 1 |

Tap water to volume.
Mineral oil anti-foam agent—200 ml. portions as needed.

was inoculated with a culture of the organism Streptomyces sp. AG–35. The fermenter was aerated at the rate of 8 cubic feet per minute under a pressure of 10 lbs. per sq. inch gauge and agitated using a propeller rotating at 480 r.p.m. Fermentation was continued at a temperature of 28° C. for a period of 60 hours and the following table shows the amounts of amicetin produced at various intervals throughout the fermentation.

TABLE III

*Amicetin production*

| Hours | Micrograms/ml. | pH |
|---|---|---|
| 12 | 0 | 7.5 |
| 24 | 45 | 6.9 |
| 36 | 142 | 7.1 |
| 48 | 198 | 7.3 |
| 60 | 107 | 7.9 |

The amicetin produced in accordance with the above-described or equivalent methods can be recovered from the fermentation medium by utilizing the chemical and physical properties of the active material. This method involves direct extraction from the fermentation medium under alkaline conditions with a liquid water-immiscible organic solvent such as an aliphatic alcohol containing about 4–7 carbon atoms, etc. It is preferred to extract the amicetin from the fermentation medium with normal butyl alcohol, at a pH ranging from about 8.5 to 10.0 after first adjusting the pH of the fermentation medium to from about 3.0 to 4.5 with a mineral acid and filtering using a coarse diatomaceous earth filter aid. The amicetin is extracted from the solvent solution with a mineral acid such as sulfuric, hydrochloric, etc., after which the pH of the acid solution is raised to from about 5.5 to 6.0. Generally speaking the acid extraction can be carried out using from about 0.05 to 0.5 volume of 0.2 to 1.0 N acid. It is preferred to employ 0.1 volume of 1.0 N acid. The pH adjustment following acid extraction can be made with any suitable base such as, for example, an alkali metal hydroxide but it is preferred to employ a slightly soluble compound which forms an insoluble salt with the anion of the acid employed such as, for example, barium carbonate, strontium carbonate or calcium carbonate where sulfuric acid is employed since barium sulfate or calcium sulfate which forms is insoluble and precipitates from the solution from which it can then be removed by filtration, centrifugation, etc. The acid extract is then concentrated to approximately one-tenth of its original volume by distillation under reduced pressure following which the pH is raised to from about 6.8 to 7.5 with a suitable base such as for example an alkali metal hydroxide after which the amicetin crystallizes in the form of a neutral salt. The crystals are preferably recrystallized by dissolving in boiling water and cooling to obtain a substantially pure material.

The following example is given to illustrate the above-described recovery procedure as it is applied to the recovery of amicetin from a nutrient medium in which it was produced.

EXAMPLE II

A 350-gallon portion of nutrient medium containing 341 micrograms of amicetin was acidified to pH 4.0 with sulfuric acid. The material was then filtered with 3% Dicalite (diatomaceous earth) as a filter aid and the pH then adjusted to 9.5 with 50% sodium hydroxide. The amicetin was then extracted from the filtered nutrient medium with 152 gallons of n-butanol. The n-butanol solution of amicetin was then extracted with 13 gallons of N sulfuric acid and the acid extract neutralized to a pH of 5.5 with calcium carbonate. The neutralized acid extract was then filtered to remove undissolved calcium carbonate and calcium sulfate which was formed and the filtrate concentrated by distillation at reduced pressure of 0.75 gallon. The pH of the concentrate was then raised to 7.5 and the concentrate cooled to crystallize 145 grams of crystalline amicetin in the neutral salt form.

We do not intend to be limited to the specific materials and procedures shown and described herein, but rather we intend for our invention to include all equivalents within the scope of this specification and the attached claims.

What we claim is:

1. A process for the recovery of the antibiotic amicetin from fermentation media in which it is produced which comprises mixing the nutrient medium with a coarse diatomaceous earth filter aid and filtering the mixture at a pH of from about 3.0 to 4.5, extracting the amicetin from the nutrient medium with a water immiscible monohydroxy alkyl compound containing from 4–7 carbon atoms at a pH of from about 8.5 to 10.0 to form a dilute solution of amicetin in alcohol, extracting the antibiotic from said dilute alcohol solution with a mineral acid, adjusting the acid solution to a pH of from about 5.5 to 6.0, concentrating the resulting solution and raising the pH to from about 6.8 to 7.5 to crystallize the antibiotic in the neutral salt form.

2. In a process for the recovery of the antibiotic amicetin from fermentation media in which it is produced by filtering the fermentation medium at a pH of from about 3.0 to 4.5, extracting the amicetin from the filtered nutrient medium with a water immiscible monohydroxy alkyl compound containing from 4–7 carbon atoms at a pH of from about 8.5 to 10.0 to form a dilute solution of amicetin in alcohol, extracting the antibiotic from said dilute alcohol solution with a mineral acid, adjusting the acid solution to a pH of from about 5.5 to 6.0, and concentrating the resulting solution, the step which comprises crystallizing the antibiotic in the neutral salt form by adjusting the pH of the concentrated aqueous solution to from about 6.8 to 7.5 and recovering the crystals which form.

3. A process for the recovery of the antibiotic amicetin from fermentation media in which it is produced which comprises mixing the fermentation medium with a coarse diatomaceous earth filter aid and filtering the mixture at a pH of from about 3.0 to 4.5 extracting the amicetin from the fermentation medium at a pH of from about 8.5 to 10.0 with normal butyl alcohol to form a dilute solution of amicetin in butyl alcohol, extracting the antibiotic from the said dilute butyl alcohol solution with from 0.05 to 0.5 volume of 0.2 to 1.0 N sulfuric acid, adjusting the pH in the acid solution to from about 5.5 to 6.0 with a material selected from the group consisting of barium carbonate, strontium carbonate, and calcium carbonate, removing insoluble sulfate and carbonate, concentrating the solution and adjusting the pH to from about 6.8 to 7.5 with an alkali metal hydroxide and recovering the crystals of amicetin neutral salt which form.

4. A process for the recovery of the antibiotic amicetin from fermentation media in which it is produced which comprises mixing the nutrient medium with a coarse diatomaceous earth filter aid and filtering the mixture at a pH of from about 3.0 to 4.5, extracting the amicetin from the nutrient medium with a water immiscible monohydroxy alkyl compound containing from 4–7 carbon atoms at a pH of from about 8.5 to 10.0 to form a dilute solution of amicetin in alcohol, extracting the antibiotic from said dilute alcohol solution with from 0.05 to 0.5 volume of 0.2 to 1.0 N hydrochloric acid, adjusting the acid solution to a pH of from about 5.5 to 6.0, concentrating the resulting solution and raising the pH to from about 6.8 to 7.5 to crystallize the antibiotic in the neutral salt form.

5. A process for the recovery of the antibiotic amicetin from fermentation media in which it is produced which comprises mixing the fermentation medium with a coarse diatomaceous earth filter aid and filtering the mixture at a pH of from about 3.0 to 4.5, extracting the amicetin from the fermentation medium at a pH of from about 8.5 to 10.0 with normal butyl alcohol to form a dilute solution of amicetin in butyl alcohol, extracting the antibiotic from the said dilute butyl alcohol solution with 0.1 volume of 1.0 N hydrochloric acid, adjusting the pH of the acid solution to from about 5.5 to 6.0, concentrating the solution and adjusting the pH to from about 6.8 to 7.5 with an alkali metal hydroxide to crystallize the antibiotic in the neutral salt form.

References Cited in the file of this patent

UNITED STATES PATENTS

| | | |
|---|---|---|
| 2,509,191 | Lott et al. | May 23, 1950 |
| 2,516,080 | Soben et al. | July 18, 1950 |
| 2,586,762 | Finlay et al. | Feb. 19, 1952 |

OTHER REFERENCES

De Boer et al.: J.A.C.S., Jan. 20, 1953, pp. 499–500.

McCormick et al.: Antibiotics and Chemotherapy, publ. July 1953, pp. 718–720.